Aug. 23, 1966   O. R. NEMETH   3,268,287
PULSE OPERATED PHOTOGRAPHIC APPARATUS
Filed Oct. 23, 1965   3 Sheets-Sheet 1

INVENTOR.
OTTO R. NEMETH
BY
Elliott & Pastoriza
ATTORNEYS

Aug. 23, 1966     O. R. NEMETH     3,268,287
PULSE OPERATED PHOTOGRAPHIC APPARATUS

Filed Oct. 23, 1965     3 Sheets-Sheet 2

INVENTOR.
OTTO R. NEMETH
BY
Elliott & Pastoriza
ATTORNEYS

Aug. 23, 1966          O. R. NEMETH          3,268,287
PULSE OPERATED PHOTOGRAPHIC APPARATUS
Filed Oct. 23, 1965          3 Sheets-Sheet 3
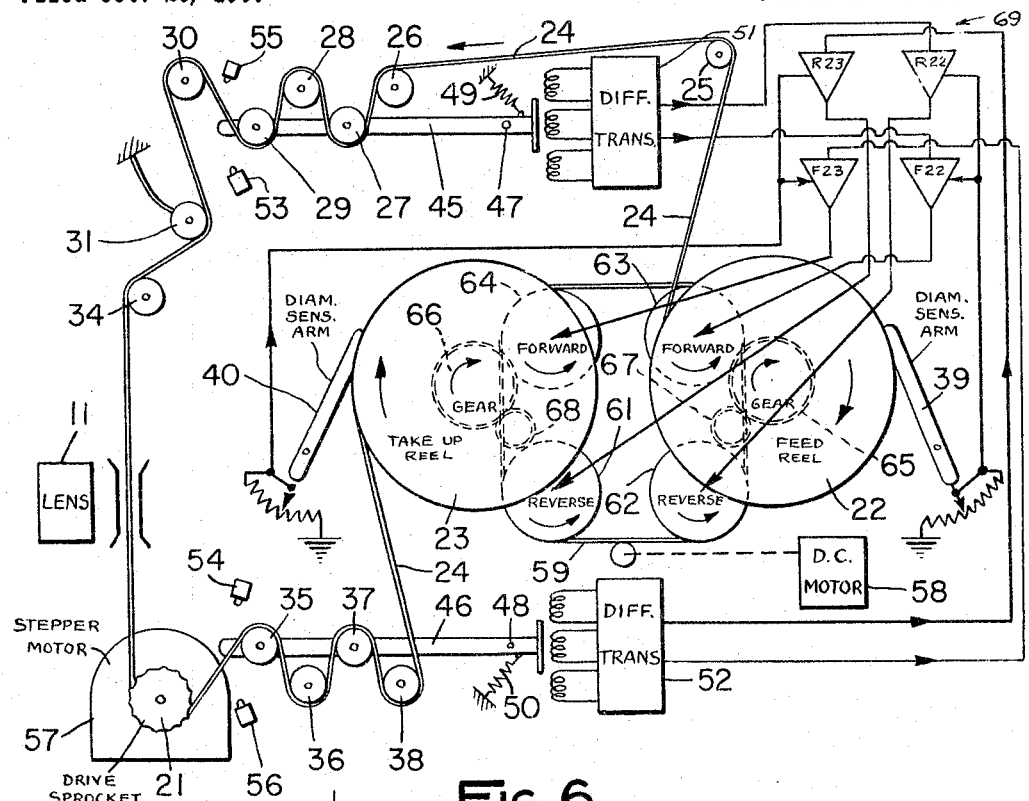
FIG. 6.
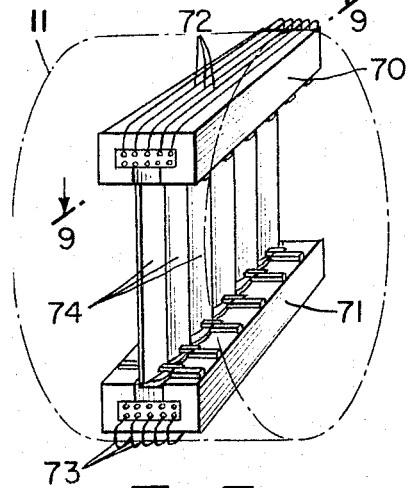
FIG. 7.    FIG. 8.    FIG. 9.    FIG. 10.
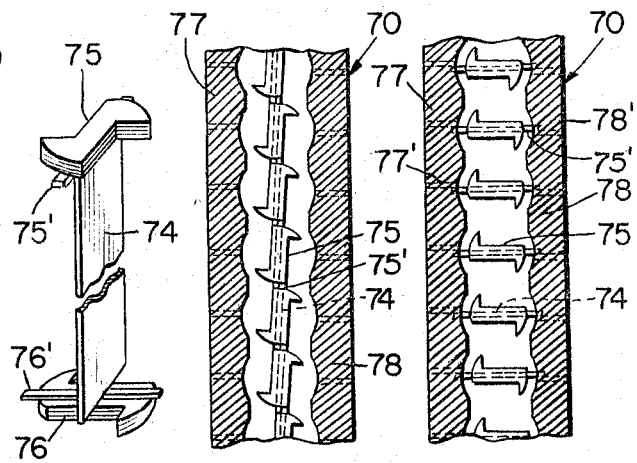
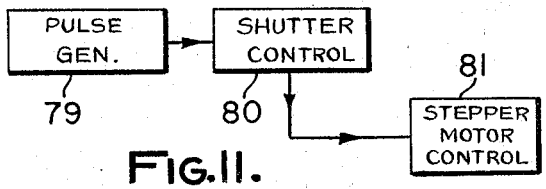
FIG. 11.
INVENTOR.
OTTO R. NEMETH
BY
Elliott & Pastoriza
ATTORNEYS United States Patent Office
3,268,287
Patented August 23, 1966

3,268,287
PULSE OPERATED PHOTOGRAPHIC APPARATUS
Otto R. Nemeth, 11907 San Vicente Blvd.,
Los Angeles, Calif. 90049
Filed Oct. 23, 1965, Ser. No. 507,988
8 Claims. (Cl. 352—187)

This invention is a continuation-in-part of my co-pending patent application Serial No. 217,388, filed August 16, 1962, now abandoned, and entitled "Photographic Apparatus."

This invention relates generally to photographic apparatus and more particularly to an improved high speed pulsed camera.

Present day motion picture apparatus, either in the form of projectors or cameras, incorporate some type of mechanical movement such as a "Geneva" movement for intermittently positioning the film in registration with an aperture. In combination with this intermittent moving mechanism there is also provided a shutter usually of the rotary type. With the use of conventional type intermittent movements and rotary shutters, reaction forces are exerted on the camera resulting in vibration and counter rotating masses which render proper resolution and film registration difficult. Moreover, mechanical type intermittent movements are limited in their response speed by the inertia of the parts themselves. In the case of extremely high speed motion picture photography, there is also imposed an extremely large load on the film sprocket openings when a conventional type of pull-down claw structure is employed. This factor in itself will somewhat limit the acceleration and deceleration of high speed motion picture cameras.

In addition to the above, however, there is associated with high speed cameras an even more serious problem. In order to operate the camera at maximum speed, the various moving parts, such as the feed and take-up reels, must be accelerated up to the operating speed. As a consequence, it is usually necessary to start the camera operating before the actual photographing is to take place. Accordingly, a considerable amount of film is wasted both during the time that the camera is brought up to speed and during the time necessary to slow the camera down to a stop. Moreover, the operation of the camera itself requires extreme vigilance in order to start the camera operating sufficiently early to insure that it will be brought up to proper speed at the time desired pictures are to be taken.

The same problem as set forth above is present in high speed single picture taking operations. While a motion picture may be considered a succession of still pictures, there are instances in which it may be desired to take a series of individual still pictures in a rapid and non-uniform sequence. In such case, each individual picture requires a sudden acceleration and deceleration of the film, shutter, and drive mechanism. Pulsed cameras are ideal for this latter operation as the individual pictures are respectively triggered by individual pulses and the sequence of taking pictures can thus be controlled by the time sequence of the pulses which may be quite irregular.

With the foregoing in mind, it is a primary object of the present invention to provide a greatly improved photographic apparatus of extremely high speed and yet one in which the foregoing specific problems are overcome.

More particularly, it is an object to provide a novel cine-camera which exhibits extremely low inertia effects so that high resolution and accurate registration can be readily achieved.

Another important object is to provide an improved photographic apparatus of the foregoing type which may be brought up to speeds substantially instantaneously so that no film is wasted either in starting the camera or stopping the camera and in which the taking of pictures can be triggered, if desired, by the commencement of the event to be photographed.

Another important object is to provide a novel high speed shutter means in combination with other working components of a high speed camera meeting the foregoing objects which exhibits an extremely small inertia in operating between closed and opened positions.

Briefly, these as well as many other objects and advantages of this invention are attained by employing a novel means for effecting the necessary intermittent movement in the photographic apparatus such as a camera. This means comprises a high speed pulsed motor means such as a stepper motor in combination with a sprocket wheel drive for the film and other components in the camera body and film magazine employed therewith. The desired intermittent movement is thus achieved by supplying a series of electrical pulses to the stepper motor to rotate the sprocket drive in given increments so that mechanical links, gearing, pull-down mechanisms, and switches heretofore providing such intermittent movement can be eliminated.

Basically, the apparatus of the invention includes a camera body and film magazine detachably securable to the body. The film magazine includes a sprocket wheel drive, film feed and take-up reels, and film length sensing means for the feed and take-up reels. The camera body in turn includes the pulsed motor means responsive to given electrical pulses to step the sprocket wheel through given precise arcuate increments. Also included are drive control means adapted to cooperate with the film length sensing means in the magazine for the feed and take-up reels. Suitable coupling means are arranged to couple the output of the pulsed motor to the sprocket wheel and couple the drive control means to the feed and take-up reels within the film magazine when the latter structure is secured in place on the camera.

The film length sensing means for the feed and take-up reels constitutes essentially a means for adjusting the length of film between the feed reel and the sprocket wheel and the length of film between the sprocket wheel and the take-up reel. This length of film is automatically maintained at a given value by sensing any changes in the film tension, the sensing means providing signals which will control the drive control means connected to the reels in such a manner as to maintain the film lengths substantially constant. By this arrangement, only the inertia of the section of film between the feed reel and sprocket wheel need be overcome when the sprocket wheel is rotated so that no load is imposed by the inertia of the remaining film and feed and take-up reels.

By employing a sprocket wheel as the principal drive for the film and by winding a relatively large portion of film about the sprocket wheel, several sprocket holes in the film are simultaneously engaged by the teeth on the sprocket wheel so that the load when the sprocket wheel is rotated is distributed among the sprocket holes in the film. In this manner, the film may be rapidly accelerated without tearing the sprocket holes.

The shutter mechanism is of a different type from the conventional rotary shutter and is made up of a plurality of parallel strips arranged in a venetian blind manner. The upper ends of each of the strips include an armature arranged to be disposed between magnetic pole pieces in turn energized by coil windings thereon. The lower ends of the strips also terminate in armatures which are oriented at ninety degrees to the upper armatures. These lower armatures are disposed between second or lower pole pieces individually energized by a lower coil. The arrangement is such that energization of the lower pole pieces will rotate all of the strips simultaneously to a position in which they lie in a plane co-planar with the strips themselves to close the shutter. When the lower coil is de-energized and the upper coil energized, the strips will be rotated to positions normal to the plane of the strips when in closed position to permit light to pass through the shutter. Since the inertia of each of the individual strips is extremely small, the shutter may be rapidly opened and closed in response to electrical pulses.

In the preferred embodiment of the invention, the shutter means includes a control circuit for providing the given electrical pulses to the pulsed motor means so that the pulsed motor means will only rotate the sprocket wheel when the shutter is closed.

A better understanding of the invention will be had by now referring to a preferred embodiment in the form of a high speed motion picture camera as illustrated in the accompanying drawings, in which:

FIGURE 6 is a highly schematic diagram including block portions useful in understanding the overall operation of the camera;

FIGURE 7 is a schematic perspective view illustrating the principles of the shutter mechanism of the camera;

FIGURE 8 is a perspective view of one of the shutter strip elements;

FIGURE 9 is a cross section taken generally in the direction of the arrows 9—9 of FIGURE 7 illustrating the shutter in closed position;

FIGURE 10 is a view similar to FIGURE 9 illustrating the shutter in open position; and, FIGURE 11 is a simple block diagram useful in explaining the pulsing sequence during operation of the camera.

Figure 1:
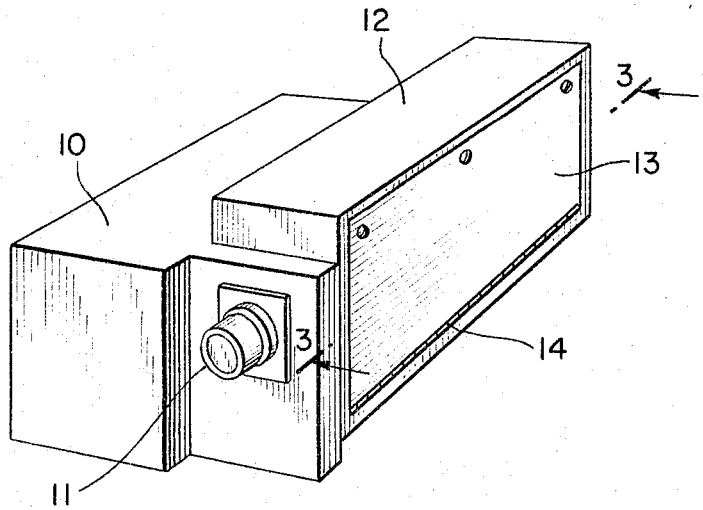
FIGURE 1 is a perspective view of the camera.

Referring first to FIGURE 1, there is shown a camera body incorporating a lens barrel 11 on a front face portion thereof and a film magazine 12 on one side. The magazine 12 may include a side door 13 hinged at its lower edge as at 14 to provide access to the interior of the magazine to enable loading and removal of film.

Figure 2:
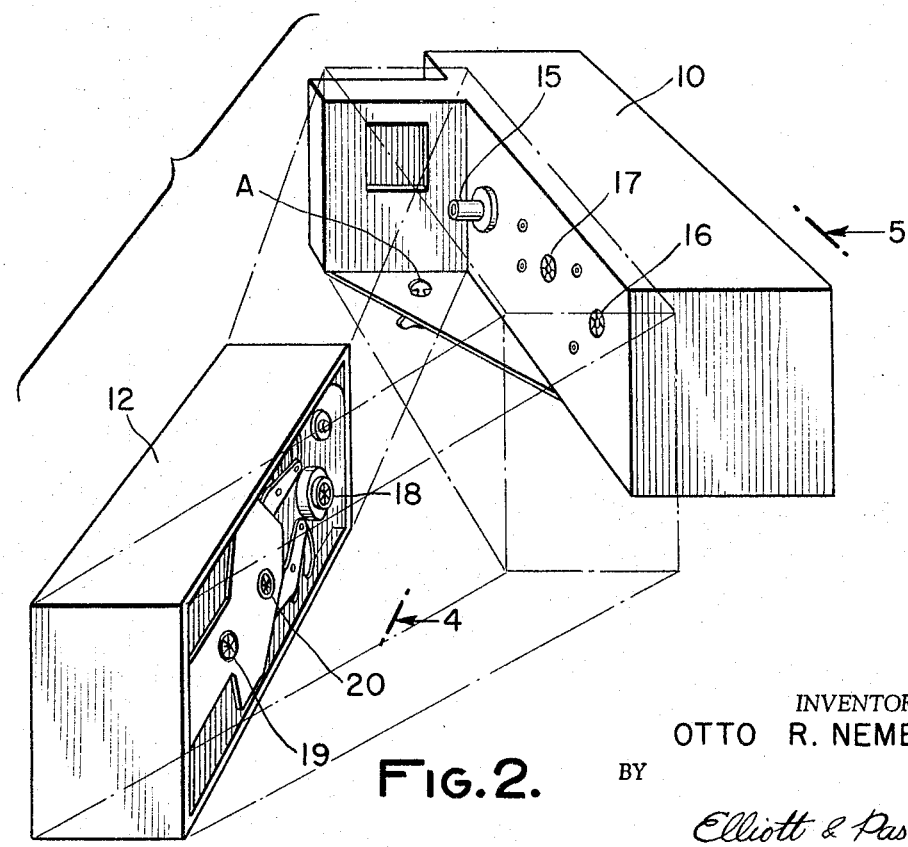
FIGURE 2 is a rear perspective view showing the magazine portion of the camera separated from the camera body.

Referring to FIGURE 2, it will be noted that the magazine 12 may be detached from the camera body 10. In accordance with the invention, the camera body 10 incorporates a pulsed motor means in the form of a stepper motor having an output shaft protruding from the side of the body as indicated at 15. This output shaft is arranged to be rotated in discrete arcuate steps in response to pulsing of the stepper motor within the camera body 10. Also included within the camera body 10 are drive control means for driving the feed and take-up reels within the magazine 12. These drive control means include driving socket couplings 16 and 17 for the feed and take-up reels, respectively, all as will become clearer as the description proceeds.

As shown in FIGURE 2, the magazine portion of the camera includes a coupling 18 adapted to engage directly the shaft 15 for rotation in discrete arcuate steps by the shaft 15 when the magazine 12 is assembled on the camera body 10. Also shown are feed and take-up reel drive couplings 19 and 20 adapted to register with and be connected to the drive portions 16 and 17, respectively, in the camera body 10 when the magazine 12 is assembled on the camera body. A simple latch type securing structure A may be provided on the camera body 10 to secure the magazine 12 in position.

Figure 3:
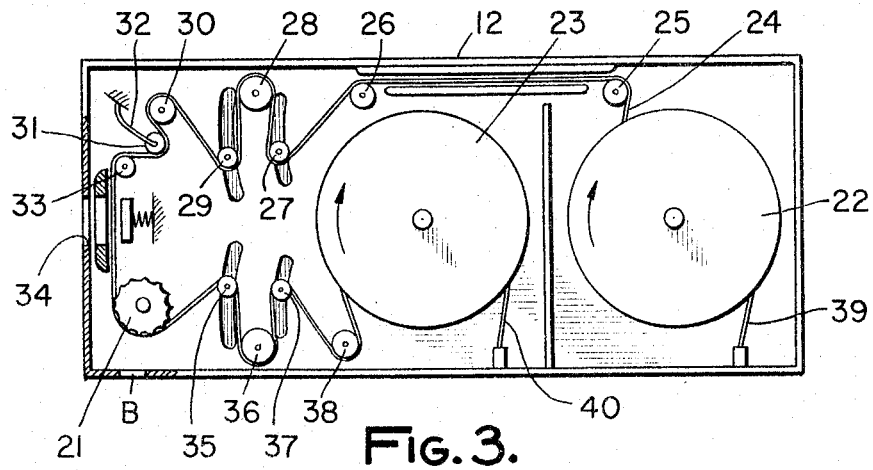
FIGURE 3 is a side elevational view of the magazine portion of the camera with the cover removed looking in the direction of the arrows 3—3 of FIGURE 1.

With reference now to FIGURE 3, it will be noted that the lower forward portion of the magazine 12 includes an opening B for cooperating with the latch A described in FIGURE 2 so that the magazine may be detachably secured to the camera body.

As also shown in FIGURE 3, there is provided a sprocket wheel 21 connected directly to the coupling 18 shown in FIGURE 2 which, as described, is arranged to be driven directly by the stepper motor shaft 15 when the magazine and camera body are assembled. Also shown in FIGURE 3 are feed and take-up reels 22 and 23, respectively. Starting with the feed reel 22, film 24 is initially passed over a guide roller 25, a second spaced guide roller 26, movable roller 27, fixed guide roller 28, a second movable roller 29, and a fixed guide roller 30. The movable guide rollers 27 and 29 are supported on an upper movable arm constituting part of a film length sensing means, the operation of which will become clearer as the description proceeds.

From the guide roller 30, the film passes over a motion filtering roller 31 flexibly mounted as by a flexible spring 32. From the motion filter roller 31, the film then passes through a fixed guide roller 33 down adjacent to an aperture 34 in the casing 12 and thence about the sprocket wheel 21. It will be noted that a considerable arcuate extent of the film passes about the sprocket wheel 21 so that a plurality of the perforations in the film are engaged simultaneously by the sprocket teeth. By this arrangement, the load on the various sprocket holes in the film is distributed when the sprocket wheel 21 is caused to rotate.

From the sprocket wheel 21, the film passes over a lower movable roller 35, fixed guide roller 36, and a second movable roller 37 to a fixed guide roller 38. The movable rollers 35 and 37 are connected to a lower movable arm structure constituting part of the film length sensing means as will become clearer later in the description. The film passes from the guide roller 38 onto the take-up reel 23 as shown so that when the feed and take-up reels 22 and 23 rotate in clockwise directions as indicated by the arrows, the film will properly unwind from the feed reel and be taken upon the take-up reel. The magazine 12 also includes film diameter sensing arms 39 and 40 for the feed and take-up reels, respectively. The function of these arms will be explained subsequently.

Figure 4:
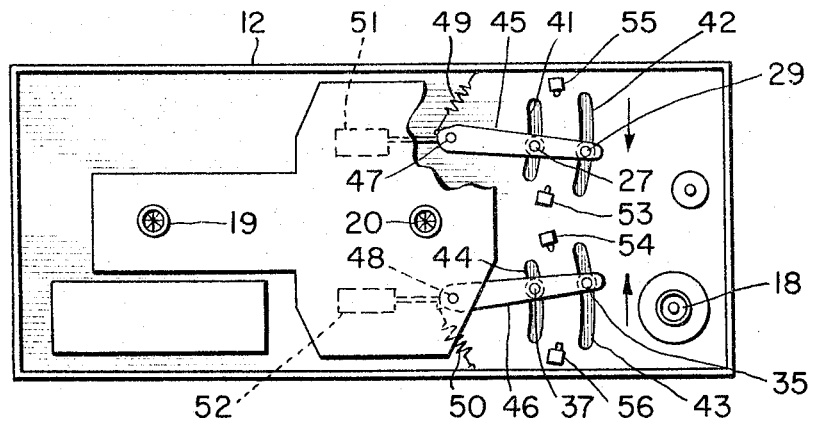
FIGURE 4 is a rear view of the inner workings of the magazine portion of the camera looking generally in the direction of the arrow 4 of FIGURE 2.

Referring to FIGURE 4 which shows the back of the magazine structure 12 illustrated in FIGURE 3, there are shown upper arcuate slots 41 and 42 through which the rollers 27 and 29 extend and lower arcuate slots through which the rollers 35 and 37 extend. As shown, these upper and lower rollers are respectively mounted on upper and lower arms 45 and 46, and pivoted at 47 and 48 for arcuate swinging movement along the slots. Suitable biasing means in the form of springs 49 and 50, respectively, urge the arms closer to each other or in a direction tending to increase the length of film passing from the feed reel of FIGURE 3 to the sprocket 21 and the length of film from the sprocket 21 to the take-up reel 23, respectively.

As indicated by the dotted lines in FIGURE 4, the positions of the arms 45 and 46 are detected by suitable sensing means such as differential transformers 51 and 52. Signals from these differential transformers in turn are connected to control the drive means which in turn drives the feed and take-up reels 22 and 23. Essentially, the arrangement is such that the tension on the film tends to move the arms 45 and 46 apart, this tendency being countered by the biasing springs 49 and 50. Therefore, under a given film tension, the arms will assume an intermediate position such as illustrated in FIGURE 3 so that a given length of film exists between the feed reel 22 and sprocket 21 and between the sprocket 21 and take-up reel 23. When the sprocket wheel 21 is moved, only this length of film between the sprocket wheel 21 and feed reel 22 need be accelerated rather than a direct pull being effected on the feed reel. The sudden demand for film, however, will move the rollers 27 and 29 upwardly, thereby causing the arm of FIGURE 4 to move upwardly and provide a signal which immediately speeds up the speed of rotation of the feed reel 22 so that the reel will pay out film towards the sprocket wheel 21. A sudden slowing of the sprocket wheel 21 will cause this length of film between the sprocket wheel 21 and the feed reel 22 to increase in length due to the mechanical lag in the film feed system. This increase will permit the bias spring 49 to move the rollers 27 and 29 in a downward direction to provide a signal which immediately reverses the direction of rotation of the feed reel 22 so that the reel will take in film, thereby shortening this length of film. Similarly, the taking up of the film by the take-up reel 23 is controlled by the lower arm 46, any variation from an intermediate position resulting in a speeding up or a reversing of the take-up reel so that the taking up of the film itself will proceed in an orderly manner.

In connection with the above and as will become clearer when the operation is described in detail, the diameter sensing arms 39 and 40 illustrated in FIGURE 3 will provide super-imposed control signals to the drive control means so that the reel speeds will be adjusted in accordance with the diameter of film thereon so that the length of film as exists when the arms 45 and 46 are in an intermediate position is maintained. Limit switches 53, 54, 55, and 56 are positioned to be engaged if the arms reach extreme positions, these switches turning off the camera.

Figure 5:
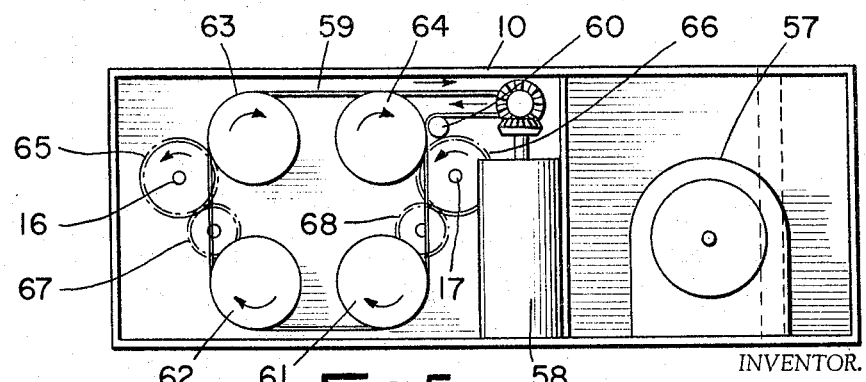
FIGURE 5 is an elevational view of the inner portions of the camera body looking generally in the direction of the arrow 5 of FIGURE 2.

The drive control means for driving the feed and take-up reels can be understood by now referring to FIGURE 5 which illustrates in somewhat schematic form the interior of the camera body as viewed in the direction of the arrow 5 of FIGURE 2. As shown, the stepper motor 57 for driving the sprocket wheel 21 of FIGURE 3 is disposed in the front portion of the body. Also included in the camera body is a D.-C. motor 58 for driving a timing belt 59 in turn passing over a guide roller 60 and four clutch members 61, 62, 63, and 64 in such a manner that the clutches are all rotated continuously in the same direction as indicated by the arrows. The clutches 63 and 64, upon energization, are arranged to cause rotation of gears 65 and 66 directly secured to the drives 16 and 17 for the feed and take-up reels, respectively. The clutches 62 and 61, on the other hand, when energized are arranged to drive the same gears 65 and 66 through reverse idler gears 67 and 68 to rotate the drive shafts 16 and 17 for the feed and take-up reels in opposite or reverse directions. Thus, in the particular arrangement set forth, the clutches 61, 62, 63, and 64 are continuously driven by the D.-C. motor 58 and timing belt 59. The extent of their action on the feed and take-up reels, however, is controlled by their degree of energization and by selectively energizing the various clutches with different magnitude signals, the reels may be made to rotate at desired speeds in forward or reverse directions.

Referring now to FIGURE 6, the overall operation of the film length sensing means including the upper and lower sensing arms, and the drive control means for the feed and take-up reels will be understood. In FIGURE 6, various components corresponding to those already described in FIGURES 1-5 are identified by identical numerals. As shown, there is provided a servo-amplifier system designated generally by the arrow 69 in the upper righthand portion of FIGURE 6. This system actually includes four amplifiers R22, F22, R23, and F23. The outputs of the sensing arms 45 and 46 as derived from the differential transformers indicated at 51 and 52 pass directly into the amplifiers R22, F22 and R23, F23, respectively. Also connected to the amplifiers R22, F22 and R23, F23, respectively, are leads from the film diameter sensing arms 39 and 40 which in the embodiment chosen for illustrative purposes may generate a varying signal by their relative positional engagement on suitable resistances as the film diameter changes.

The outputs from the four amplifiers, in turn, include four independent connections directly to the clutches 61, 62, 63 and 64. Thus, the output of amplifier R22 connects to the reverse clutch 62 for the reel 22, the output from the amplifier F22 connects to the forward clutch 63 for the reel 22, the output from the amplifier R23 connects to the reverse clutch 61 for the reel 23, and the output from the amplifier F23 connects to the forward clutch 64 for the reel 23. The degree of "clutching" action in either the forward or reverse directions determines the speed imparted to the feed and take-up reels. Thus, when complete clutching action takes place in the forward operating clutches 63 and 64, the feed and take-up reels are rotated at their maximum speed in this direction. When only a partial clutching action is effected, the feed and take-up reels will tend to drag somewhat and their speed will be determined by the lengths of film between the feed reel 22, take-up reel 23, and sprocket 21. Similarly, the clutching action on the two reverse operating clutches 61 and 62 determines the speed of the feed and take-up reels in the reverse direction. Thus, the magnitude of the signal applied to either the forward or reverse clutches will determine the degree of clutching action which in turn will vary the speeds of the reels to effect the desired speed control. The magnitude of the signal applied to the clutches in turn is controlled by the signals from the differential transformers 51 and 52 as well as from the diameter sensing arms 39 and 40.

When the pivoted arms 45 and 46 are in an intermediate position to provide a given length of film between the feed reel and the sprocket wheel 21 and a given length of film between the sprocket wheel and the take-up reel, the operation of the camera can take place in a normal manner. Should the camera be speeded up or should some other event occur which would cause the sprocket 21 to suddenly demand more film from the feed reel and consequently supply more film to the take-up reel, the given length of film between the feed reel and sprocket wheel would become shorter and the arm 45 would tend to move up. Also, the given length of film between the sprocket wheel and take-up reel would increase resulting in the arm 46 moving upwardly. These actions would result in signals being generated in the differential transformers 51 and 52, respectively, which signals are passed to the amplifiers F22 and F23 and converted to output signals to selectively drive the forward operating clutches 63 and 64 in a manner to increase the forward speed of the feed and take-up reels so that the arms 45 and 46 may return to their intermediate positions.

Should the camera be slowed down or should some other event occur which would cause the sprocket 21 to suddenly demand less film from the feed reel and consequently supply less film to the take-up spool, a given length of film between the feed reel and the sprocket 21 would increase and a given length of film between the sprocket wheel and the take-up reel would decrease and due to the action of the biasing spring 49, the arm 45 would tend to move down and the decrease in the film length to the take-up reel would tend to move the arm 46 down. These actions will result in signals passing from the differential transformers to the amplifiers R22 and R23 respectively to actuate the two reverse operating clutches 62 and 61. This action will cause the feed and take-up reels to rotate in a reverse direction thus shortening the length of film between the feed reel and the sprocket wheel and increasing the length of film between the sprocket wheel and the take-up reel, thus returning the arms to their intermediate position.

The diameter sensing arms 39 and 40 provide signals to the amplifiers in accordance with the diameter of the film on the respective reels. If the diameter is large, the output energy of the clutch control signal is increased to overcome the greater inertia of the reel. If the diameter is small, the output energy of the clutch control signal is decreased because of the small movement of inertia of the reel.

There is thus developed a balance between the tension on the film and the spring bias of the arms so that substantially constant lengths of film are maintained. The servo action is entirely automatic and is continuously taking place so that proper lengths of film are always provided, notwithstanding changes in the operating speed of the camera or changes in the diameter of the film or the amount of film wound on the reels, respectively.

In the event that some type of failure should develop in the amplifiers and clutch mechanism such that the film reels are driven too rapidly or not rapidly enough, the sensing arms 45 and 46 will move to such an extent that either the micro switches 53 and 54 will be engaged or the micro switches 55 and 56 will be engaged. The positioning of these micro switches is such that they will de-energize the entire camera so that the film will not be damaged.

Referring now to FIGURES 7, 8, 9 and 10, the improved shutter structure employed in the camera of this invention will be described. As shown, the shutter means itself is preferably incorporated within the lens barrel 11. This shutter includes upper and lower coil cores 70 and 71 including upper and lower coils 72 and 73, respectively wound thereabout. Between these cores, there are provided a plurality of thin elongated shutter strips 74 arranged similarly to a venetian blind. Since each of the shutter strips is identical, description of one will suffice for all.

Thus, referring to FIGURE 8, there is shown one of the shutter strips 74 terminating at its upper end in an armature 75 oriented in alignment with the plane of the strip 74. Beneath the armature 75 and rotatable therewith is an upper stop bar 75'. The lower end of the strip, in turn, terminates in a lower armature 76 oriented at right angles to the armature 75. A lower stop bar 76' rotatable with the armature 76 is provided as shown. The upper and lower armatures 75 and 76 are arranged to be respectively received within the cores 70 and 71 and the stop bars 75' and 76' arranged to pass adjacent to the core surfaces.

Referring, for example, to FIGURES 9 and 10, it will be noted that the upper core 70 includes pole pieces 77 and 78 defining an elongated gap therebetween. Within this gap, each of the upper armatures extends so that energization of the coil 72 will result in simultaneous rotation of the upper armatures 75 from the position illustrated in FIGURE 9 to the position illustrated in FIGURE 10. The poles 77 and 78 also include raised stops 77' and 78' respectively for engagement by the bars 75' when swung to the position illustrated in FIGURE 10.

The lower core 71 similarly includes opposed pole pieces defining an elongated gap within which the lower armatures 76 extend. Since these lower armatures, however, are oriented at right angles to the upper armatures, energization of the lower coil 76 will rotate each of the individual strips back from the position illustrated in FIGURE 10 to the position illustrated in FIGURE 9. The lower bar 76' will engage similar stops on the lower core 71 in this position. Thus, when the lower coil 73 is energized and held in an energized state, each of the individual strips 74 will be held in the position illustrated in FIGURE 9, in which position they all lie in a plane co-planar with the strips themselves so that the shutter is in closed condition. When the lower coil 73 is de-energized and the upper coil 72 energized, the strips will simultaneously be rotated approximately through ninety degrees to the position illustrated in FIGURE 10, and if the upper coil 72 is maintained energized, the strips will be maintained in the positions shown wherein they are normal to the plane of the strips as illustrated in FIGURE 9. In this latter condition shown in FIGURE 10, the shutter is open.

In the absence of energization of either the coil 72 or 73, the shutters may assume any arbitrary position. Thus, it is required that a sustaining current be provided on the coil 73 to hold the shutters in closed position as illustrated in FIGURE 9 or a sustaining current supplied to the coil 72 to hold the shutter in an open condition as illustrated in FIGURE 10. Since each shutter strip has an extremely small moment of inertia, and since each is individually driven directly by its own armature, the strips may be rotated extremely rapidly in response to a pulse of electrical energy between their opened and closed positions.

Referring now to FIGURE 11, there is illustrated one means of coordinating the action of the shutter and pulsed stepper motor for moving the film. As shown, there is provided a pulse generator for providing a series of electrical pulses at equally spaced time intervals. The frequency of these pulses may be varied to vary the speed of operation of the camera. The pulse generator 79 may be externally located and the pulses passed to the camera structure itself through any suitable electrical leads. Alternatively, the pulse generator may be incorporated within the camera body. In either event, the pulses provided by the pulse generator are hereinafter referred to as external pulses.

As shown, these external pulses are passed to a shutter control mechanism 80 incorporating means for passing signals to the upper and lower shutter control coils 72 and 73 described in FIGURE 7. When the camera is initially readied for operation, a sustaining current is passed to the coil 73 to hold the shutter closed. When it is desired to take pictures, pulses from the generator 79 are passed to the camera. The first pulse of energy from the pulse generator 79 passes to the shutter control 80 and will provide a current in the coil 72 to snap all of the individual shutter strips 74 to open position as illustrated in FIGURE 10. A suitable timing circuit responsive to this pulse provides a sustaining current to hold the shutters in open position for a given exposure time.

After this given exposure time, a control pulse is generated in the shutter control circuit 80 to de-energize the coil 72 and energize coil 73 thereby snapping all of the shutters to closed position as shown in FIGURE 9. Just prior to completion of the shutter closing pulse, the shutter control mechanism generates a given pulse of electrical energy which is passed to the stepper motor control 81 for the stepper motor 57 of FIGURE 5. This given pulse to the stepper motor actuates the stepper motor to commence rotation of the sprocket wheel 21 through a given arcuate distance to move the film. The arrangement is such that any mechanical lag time is greater than the amount of time to complete closing of the shutter strips so that when the shutter strips are completely closed, the physical movement of the film simultaneously commences.

After completion of the film movement by arcuate movement of the sprocket wheel 21, the camera is in condition to receive another pulse from the pulse generator 79 to repeat the cycle.

The particular types of control circuits within the shutter control 80 and the stepper motor control 81 may take many different forms. It is only necessary that suitable time duration wave forms be provided to control the shutter operation and stepper motor operation in proper sequence.

From the foregoing description, it will be evident that the present invention has provided a greatly improved high speed motion picture apparatus. By employing the new approach of a sprocket wheel drive for the film wherein a large number of film perforations are engaged simultaneously, the film itself may be extremely rapidly accelerated without tearing of the sprocket holes. Moreover, as a consequence of the speed control means including the sensing arms 45 and 46 described in conjunction with FIGURE 6, only given lengths of film need actually be accelerated so that the camera may be substantially instantaneously started at maximum speed without the inertia of the feed reel intefering therewith. In fact, at no time does the feed reel constitute any drag because of the specific drive therefor under control of the sensing arms and differential transformers as described.

In addition to the foregoing, the unique shutter design enables extremely high speed and accurate shutter control to be realized. Since each individual shutter strip is simultaneously but individually energized, the moment of inertia of the shutter as a whole is extremely small. Thus, the action is different from a conventional rotary type shutter which must be brought up to speed in order to take a certain number of pictures per unit time.

While certain components of the entire structure have been described in some detail, it is to be understood that the invention is not to be thought of as limited to such details since equivalent structure can achieve the same functional results. The improved pulse operated photographic apparatus is therefore not to be thought of as limited to the specific embodiment set forth merely for illustrative purposes.

What is claimed is:

1. A photographic apparatus comprising, in combination: a casing including an aperture and sprocket means for positioning successive portions of film in registration with said aperture, said sprocket means comprising a sprocket wheel having sprocket teeth for engaging the sprocket holes in said film over an arcuate extent of at least sixty degrees so that pulling forces on said sprocket holes are distributed among said sprocket holes; pulsed motor means actuated in response to given electrical pulses to effect discrete motion steps, said pulsed motor means being connected to said sprocket means whereby intermittent movement of said film is effected upon actuation of said pulsed motor means; a shutter means adjacent said aperture responsive to external electrical pulses to open and close said shutter means including control means for passing said given electrical pulses to said pulsed motor means to actuate said sprocket wheel only when said shutter means is closed; film feed and take-up reels and film length sensing means for feeding film to said sprocket wheel and taking up film passed from said sprocket wheel; and reel feed and take-up drive control means responsive to said film length sensing means to cause said film feed and take-up reels to rotate at a speed to maintain substantially constant the lengths of film between said feed reel and sprocket wheel and between said sprocket wheel and take-up reel.

2. A pulse operated camera comprising, in combination: a camera body; a film magazine; means for detachably securing said film magazine to said camera body, said film magazine having an aperture and including: an intermittent sprocket wheel adjacent said aperture; and film feed and take-up reels and film length sensing means for feeding film to said sprocket wheel and taking up film passed from said sprocket wheel, said camera body including: pulsed motor means including an output shaft and responsive to given electrical pulses to rotate said output shaft in discrete steps of equal degree; shutter means adjacent said aperture when said magazine is secured to said camera body and responsive to external electrical pulses to open and close; reel feed and take-up drive control means responsive to said film length sensing means; coupling means for coupling said output shaft to said sprocket wheel; and coupling means for coupling said drive control means to said film feed and take-up reels and film length sensing means upon securing of said film magazine to said camera body.

3. The subject matter of claim 2, in which said film length sensing means includes upper and lower pivoted arms terminating in rollers about which said film is passed so that swinging movement of said arms varies the length of film between said feed reel and said sprocket wheel and the length of film between said sprocket wheel and said take-up reel respectively, biasing means biasing said arms in directions tending to increase each said length, tension in said film acting to move said arms to decrease each said length so that said arms normally assume intermediate positions; and arm position sensing means responsive to movement of said arms from said intermediate positions connected to said drive control means to control the speed of said feed and take-up reels in a manner to enable said arms to return to said intermediate positions.

4. The subject matter of claim 3, including film diameter sensing means associated with said feed and take-up reels for sensing the amount of film wound on each reel, said sensing means connecting to said drive control means so that the control of said feed and take-up reels is adjusted in accordance with the amount of film wound on each reel.

5. The subject matter of claim 4, in which said reel feed and take-up drive control means includes forward and reverse clutches coupled to rotate said feed and take-up reels in forward and reverse directions when a corresponding clutch is energized, said arm position sensing means energizing various ones of said clutches with given magnitude signals to drive said feed and take-up reels in directions and at speeds to cause said arms to assume their intermediate positions.

6. The subject matter of claim 5, in which said shutter means includes control means providing said given electrical pulses to said pulsed motor means in response to each closing of said shutter by said external electrical pulses so that said film is moved by said sprocket wheel only while said shutter means is closed.

7. The subject matter of claim 6, in which said shutter means includes upper and lower magnetic cores having upper and lower coils respectively, each magnetic core including elongated opposed pole pieces defining an elongated gap therebetween; a plurality of parallel strips of width wider than the spacing therebetween having their upper ends each terminating in an individual upper armature disposed in the gap of said upper opposed pole pieces and having their lower ends each terminating in an individual lower armature oriented at substantially right angles to said upper armature whereby energization of said upper coils rotates the upper armatures through ninety degrees to simultaneously swing said strips into approximately a plane co-planar with said strips, thereby blocking light from passing therethrough and de-energization of said upper coils and energization of said lower coils rotates said lower armatures back through ninety degrees to simultaneously swing said strips into positions normal to said plane to permit light to pass between said strips.

8. The subject matter of claim 6, including stop bars rotatable with said armatures respectively; and stationary stop means positioned with respect to said coils to be engaged by said stop bars when said shutters are swung between open and closed positions.

No references cited.

JULIA E. COINER, *Primary Examiner.*